Patented Apr. 6, 1943

2,315,514

UNITED STATES PATENT OFFICE 2,315,514

PREPARATION OF ORGANIC SULPHINIC ACIDS

Arthur L. Fox, Woodstown, N. J., assignor to E. I. du Pont de Nemours & Company, Wilmington, Del., a corporation of Delaware No Drawing. Application November 22, 1938, Serial No. 241,869

7 Claims. (Cl. 260—500)

This invention relates to the preparation of new organic sulphinic acids; more particularly, it relates to the preparation of new saturated hydrocarbon sulphinic acids and saturated chlorohydrocarbon sulphinic acids and to mixtures containing mixtures of aforesaid sulphinic acids. Still more particularly the invention relates to a process for preparing new sulphinic acid mixtures from the organic sulphonyl chlorides obtained by reacting organic compounds, preferably saturated hydrocarbons with a gaseous mixture of sulphur dioxide and chlorine after the manner set forth in Reed U. S. Patent 2,046,090 and Fox, Henke, Lockwood & Tinker application, Serial No. 216,838, filed June 30, 1938. The invention further relates to processes of preparing such sulphinic acid.

When a saturated hydrocarbon or mixture of saturated hydrocarbons or predominating in such hydrocarbons, is reacted with a gaseous mixture of sulphur dioxide and chlorine at a temperature below the decomposition point of the formed organic sulphonyl chlorides in the above-identified manner, a very complex mixture of products is formed which contains hydrocarbon monosulphonyl chlorides, chlorohydrocarbon monosulphonyl chlorides, hydrocarbon polysulphonyl chlorides, chlorhydrocarbon polysulphonyl chlorides, and chlorohydrocarbons. Similar results are obtained with hydrocarbon derivatives. The proportion of products in the mixture can be varied somewhat by varying the proportions of sulphur dioxide to chlorine, the rate of flow, the intensity of the actinic light used to accelerate the reaction, pressure, and temperature conditions.

In the case where the saturated open chain hydrocarbons and derivatives thereof, e. g. the normally liquid or easily liquefiable alkanes, isoalkanes, chloroalkanes and mineral oil fractions free from aromatic and unsaturated constituents are used as initial reactants, the mixtures are unusually complex since the sulphonyl chloride groups do not enter the same position in each molecule. Hence, the sulphinic acids prepared from these starting materials are quite complex when the entire fraction or a portion which consists essentially of organic sulphonyl chlorides are used.

The reaction products obtained from using saturated unsubstituted cycloaliphatic hydrocarbons, e. g. cyclobutane, cyclopentane, cyclohexane, cycloheptane, etc., as initial reactants are not quite as complex due to the fact that only one monosubstituted isomer is formed, and the sulphinic acid mixtures which may be prepared in accordance with the teachings hereof can sometimes be separated as pure compounds.

This invention has for an object the preparation of new organic sulphinic acids. A further object is the preparation of new hydrocarbon sulphinic acids from a cheap source of raw materials. A still further object is the preparation of new sulphinic acid salts. A still further object is the preparation of organic sulphinic acids in commercial quantities and a general advancement in the art. Still other objects will appear hereinafter.

The above and other objects are accomplished by the following invention which comprises reducing the organic sulphonyl chlorides obtained by reacting an organic compound with a gaseous mixture of sulphur dioxide and chlorine in the manner above described. In a preferred embodiment of the invention, they are accomplished by reacting a selected reducing agent with a chlorohydrocarbon sulphonyl chloride and hydrocarbon sulphonyl chloride mixture. In a still more preferred embodiment of the invention a mixture comprising essentially chlorohydrocarbon sulphonylchlorides and hydrocarbon sulphonyl chlorides obtained by reacting a gaseous mixture of sulphur dioxide and chlorine after the above-described manner with a saturated normally liquid or easily liquefiable hydrocarbon is reacted with an appropriate alkali metal sulphur containing reducing agent, e. g. sodium sulphite, sodium bisulphite, sodium hydrosulphite or sodium sulphide, and the corresponding potassium compounds.

The preparation of the hydrocarbon sulphonyl chloride, chlorohydrocarbon mixture which is representative of an initial material suitable for the present invention is exemplified by the following procedure: A gram molecular weight of a normally liquid saturated aliphatic or alicyclic hydrocarbon is placed in a glass container and an electric light is placed close to it. A mixture of sulphur dioxide gas and chlorine gas, preferably at least 2 mols $SO_2$ to one of chlorine, is then passed into the hydrocarbon. Some means of dispersing the gas such as a sintered glass distributor, agitation, etc., is desirable. As the mixture of sulphur dioxide and chlorine enters the liquid, the temperature rises and cooling should be applied if the temperature rises too high. For low boiling hydrocarbons this cooling is very essential in order to avoid excessive losses of hydrocarbon. The weight of the reaction mass is taken from time to time and when a gain in weight equal to about 10-20% more than theory for the introduction of one SO₂Cl group has occurred the reaction is stopped and the reaction product is blown with dry nitrogen, carbon dioxide or other inert gas. The residue is the crude sulphonyl chloride used in the following experiments and consists of 60-90% of a mixture of sulphonyl chlorides and chloro sulphonyl chlorides, the remainder being unreacted hydrocarbon and chlorinated hydrocarbon.

The invention will be further illustrated but is not to be limited by the following examples, in which the parts stated are parts by weight unless otherwise indicated. In these examples it should be distinctly understood that the sulphonyl chlorides described in each of the examples are prepared from a normally liquid or easily liquefiable hydrocarbon and gaseous sulphur dioxide and chlorine preferably under the conditions set forth in the Fox, Henke, Lockwood & Tinker application, Serial No. 216,838, above referred to.

EXAMPLE I

One hundred grams of cetane sulphonyl chloride (analysis Cl 26.50%, sulphur 11.62) including chlorcetanesulphonyl chlorides and cetane sulphonyl chlorides were reacted with 200 grams Na₂S.9H₂O and 200 cc. water. The initial temperature was 50° C., but rose gradually over the next 20 minutes to over 75° C. It then fell to 72° at which point heat was applied. At this point the product was almost entirely soluble in water, but was refluxed for 4 hours and then allowed to stand overnight. A small amount of oil came to the surface and was separated; weight 3 g. Analysis, chlorine 20.12%, sulphur 6.80%. The aqueous layer was treated with acid and a heavy oil precipitate of the sulphinic acid was thrown out. This was separated and washed with water and then dissolved in sodium hydroxide and filtered from insoluble material (sulphur) and the filtrate again precipitated and the oil separated. This is a mixture of chlorcetyl sulphinic acids and cetyl sulphinic acids which was obtained in a yield of 90 g.

EXAMPLE II

One hundred and twenty-six grams of sodium sulphite and 625 cc. water were mixed and 186 g. of a mixture comprising essentially chlorcetane sulphonyl chlorides and cetane sulphonyl chlorides added. The reaction mixture was stirred at 30° for 20 hours and was then made slightly alkaline taking 25 cc. 10 normal sodium hydroxide. It was stirred for 1 hour after the sodium hydroxide was added and was then separated from 146 g. of oil. The clear aqueous layer was warmed on the steam bath to break up any emulsion of oil, but no oil was separated out. The aqueous layer was then acidified and an oil was thrown out. This oil is a mixture of chlorcetyl sulphinic acid, and cetyl sulphinic acids but contains considerable water. This oil is soluble in fresh water, but is again re-precipitated by the addition of small amounts of acid.

EXAMPLE III

Two hundred and fifty-two grams sodium sulphite were dissolved in 1250 cc. water and 373 grams of chlor white oil sulphonyl chlorides and white oil sulphonyl chlorides was added. These were stirred 68 hours and were found to be quite acid. It was made alkaline and treated with 500 cc. alcohol to cause the separation of any emulsified oil. This did cause a separation of 120 g. which was separated and discarded. The aqueous portion was acidified and the sulphinic acid separated as a layer, weight 470 g. This contains considerable water but titration with permanganate indicated that it is 65% active ingredient. The white oil sulphonyl chlorides were prepared in the manner set forth in Example 1 of the above-identified Fox, Henke, Lockwood & Tinker application, Serial No. 216,838.

EXAMPLE IV

Two hundred and fifty-two grams of sodium sulphite and 750 cc. water were mixed and to the solution was added, 182 grams cyclohexane sulphonyl chloride. The solution became warm at first (40°) and stayed that way for several hours. After 3 hours the solution became perfectly clear, but shortly thereafter became cloudy and an oil separated out on the bottom. After stirring over night at room temperature the separated oil was drawn off and showed strong reducing properties, although it does not all dissolve in water. The oil is the cyclohexane sulphinic acid and titrated 47.5% purity by the potassium permanganate method. This is undoubtedly due to the presence of considerable water.

EXAMPLE V

Three hundred and forty-eight grams of sodium hydrosulphite were dissolved in 1500 cc. water and 373 grams of chloro cetane sulphonyl chlorides and cetane sulphonyl chlorides were added. This was stirred for 20 hours 10 normal caustic being added from time to time to keep the reaction mass alkaline to brilliant yellow. A total of 330 cc. was necessary. After 20 hours there was a small layer of emulsified oil which was separated by centrifuging. The weight of oil thus separated was 45 g. The aqueous layer of sodium salt of chlor cetane sulphinic acid was acidified and the crude wet sulphinic acid drawn off as an oil; weight 305 g. This could be further purified by centrifuging, but all of the water could not be removed in this manner. This product is soluble in water but is again precipitated by acidification.

EXAMPLE VI

Two hundred grams of sodium bisulphite, 300 cc. of water and 100 grams of a mixture of cetane sulphonyl chlorides and chlorcetane chlor cetane sulphonyl chlorides (Cl 46.80% S 5.79%) were heated in a boiling water bath for 10 hours. At that time there was a large oil layer approximately equal in size to the oil layer at first encountered when the reaction was begun. This layer however, was water-soluble in contrast to the original product and consisted of the sulphinic acid mixed with some emulsified polychlor cetane and some water.

The sulphinic acids may be recovered either as free acids or their salts as will be obvious from the above disclosure. The free acids may be neutralized with a base which may be either inorganic or organic. The neutralization is preferably carried out in an aqueous medium. As examples of suitable bases which may be used mention is made of potassium and caesium hydroxides, sodium carbonate, potassium carbonate, ammonium carbonate and ammonium hydroxide. Substituted ammonium salts or amine salts may be obtained by neutralizing the product with aqueous solutions of quaternary ammonium bases or aliphatic, cycloaliphatic, aromatic and heterocyclic amines, e. g. dimethylamine, diethylamine, ethylamine, alkylolamines, triethanolamine, piperidine, diethyl-cyclohexylamine, pyridine, aniline, toluidines, xylidines, α-naphthylamine, tetraethyl-ammonium hydroxide, etc.

The neutralization may be affected with dilute or concentrated aqueous solutions.

The initial compounds set forth in the above examples are only representative of many other compounds which could be used. Thus, the reaction products obtained by using a gaseous mixture of sulphur dioxide and chlorine according to the aforedescribed process with any satuiated liquid or easily liquefiable hydrocarbon may be substituted as examples of specific other hydrocarbons. Mention is made of pentane, octane, nonane, decane, dodecane, octadecane, tetracosane or menthane, pinane, camphane, naphthanes, etc. Likewise, substituted hydrocarbons such as long chain aliphatic carboxylic acids, e. g. stearic, palmitic, etc., alkyl halides, e. g. octadecylbromide, hexadecyl chloride, cyclohexyl bromide, alcohols, e. g. decyl alcohol, dodecyl alcohol and octadecyl alcohols may be used as initial reactants. One may also use the long chain aliphatic or cycloaliphatic ketones, esters and other non-functional derivatives. Mixtures of each of the herein described compounds may be used.

The sulphinic acids and their water-soluble salts particularly those prepared from the above-described sulphinic acids obtained from non-gaseous hydrocarbons, have wide utility in the arts. Thus, they may be used as reducing agents for discharge printing and for printing vat colors. They have fair detergent properties. They are excellent emulsifying agents and are useful in a great many types of emulsions and emulsifiable compositions. The following examples illustrate such uses.

Example VII

Oiling and lubricating

The hereindisclosed sulphinic acids and particularly their amine salts from non-gaseous hydrocarbons are useful emulsifying agents for the preparation of emulsions to be used for oiling and lubricating fibers. About 5 to 25 parts of the diethyl cyclohexylamine salt of cetane sulphinic acids are required to prepare an emulsion of 100 parts of oil. The agent is first dissolved in 50 to 200 parts of water which contains an alkaline material as borax up to about 20 parts. The oil is then added gradually with stirring until a homogeneous oil-in-water emulsion results. This emulsion is then diluted with water to 1 to 6% oil content, and is sprayed onto yarn or raw stock to give a 100% take up. Where the take-up is less than 100%, a more concentrated emulsion may be used.

Example VIII

The hereindisclosed sulphinic acids and particularly their amine salts from non-gaseous hydrocarbons are very useful and unique emulsifying and dispersing agents for liquids and solids insoluble in water. Various examples of the dispersions of solids in water have already been given. Emulsions of oils, fats, waxes, resins, and the like may be prepared as oil-in-water or water-in-oil types, with the aid of the herein described surface active agents and a proper control of pH. At pH values above 7, emulsions containing the sulphinic acids and salts are generally oil-in-water type, while below pH 7 emulsions containing sulphinic acids and salts are usually water-in-oil type. Thus, these agents provide an emulsifying agent with which it is possible not only to prepare the type emulsions desired, but also to invert the emulsion at will to the opposite merely by altering the pH of the emulsion. In general, about 10 to 15 parts of sulphinic acids and salts are required to emulsify 100 parts of oil, etc. although in some cases up to 50 parts may be required. The emulsions are prepared in the usual manner with or without the addition of buffer compounds to control the pH. Emulsions with the sulphinic acids and salts at pH below 7 are extremely stable, and above pH 7 are moderately stable. The unusual emulsifying properties of the herein described surface active agents make them of special interest as emulsifying agents in the preparation of cosmetics and drugs. They are particularly adapted for use in the preparation of external phase water-in-oil cosmetics as beauty creams, sun tan creams, etc., where it is of decided advantage to make a product having approximately the same pH as the skin. They are likewise useful in the preparation of external phase drug and pharmaceutical emulsions as emulsions of chaulmoogra oil for use in the treatment of leprosy. They may also be used for the preparation of polishing compositions such as floor wax, furniture and shoe polishes, and the like, and for the preparation of hard oil lubricants, asphalt emulsions, etc.

The agents, e. g. chlorocetane sulphinic acids are also useful for the emulsification of materials which are subsequently polymerized in the dispersed phase. Representative of such materials are butadiene, its homologues or substitution products, (e. g. chloro-2-butadiene-1,3) which may be polymerized to emulsions of rubber-like products. Other monomeric compounds which may be polymerized in emulsion form to plastic materials are acrylic acid, methacrylic acid, their homologues, esters and other derivatives thereof, styrene, etc.

Example IX

Insecticides and agricultural sprays

The herein disclosed sulphinic acids and particularly their amine salts from non-gaseous hydrocarbons are useful as wetting and spreading agents for insecticides and agricultural sprays. In addition, they act as emulsifying agents for the preparation of aqueous sprays containing oils, and as dispersing agents for incorporating insoluble solids in aqueous sprays. For example, a citrus spray is prepared by making an emulsion containing approximately 0.2% lead tetraethyl, 0.25% mercuric oxide, 1% trisodium phosphate, 1.55% cetane sulphinic acids, 55% mineral oil, and 42% water. One part of the emulsion is diluted with 10 to 100 parts of water before use. The presence of such agents makes the spray considerably more effective with resulting economy of use. The use of the agents is not limited to the composition given above, but they may be incorporated advantageously in many other aqueous sprays.

Example X

Ten grams olive oil, 89 g. of water and 1 g. chlor white oil sulphinic acids sodium salt were stirred in a soda stirrer. The emulsion so produced showed good stability. Technical white oil or lubricating oil 1268 were successfully substituted for the olive oil. The free sulphinic acids can also be substituted for the sodium salt, but the emulsion is not quite so stable.

EXAMPLE XI

Sixty grams olive oil, 34 g. water and 6 g. chlor-cetane sulphinic acids sodium salt were well mixed with a soda stirrer and a stable emulsion resulted. Technical white oil or lubricating oil 1268 could be successfully substituted for the olive oil and the free sulphinic acid could be substituted for the sodium salt.

EXAMPLE XII

Fifteen grams cetyl alcohol, 5 g. stearyl alcohol, 65 g. cosmetic grade white oil, 10 cc. $H_2O$ and 5 g. chlorcetanesulphinic acids sodium salt were mixed in a soda stirrer. The emulsion so formed was very stable.

The free acids and their water-soluble salts are also useful as intermediates for the production of chemical compounds. The sulphinic acids and their water-soluble salts of this invention are also useful in stabilizing photographic silver halide emulsions and may be employed with the usual binders and other components of photographic emulsions and used in wrapping papers.

As many apparently widely different embodiments of this invention may be made without departing from the spirit and scope thereof, it is to be understood that we do not limit ourselves to the specific embodiments thereof except as defined in the appended claims.

I claim:

1. A process which comprises reacting in an aqueous medium a mixture containing saturated aliphatic hydrocarbon sulphonyl chlorides and chlorohydrocarbon sulphonyl chlorides, wherein the hydrocarbon radicals correspond to saturated non-gaseous aliphatic hydrocarbons, with a reducing agent taken from the group consisting of sodium and potassium sulphite, bisulphite, hydrosulphite, and sulphide and recovering from the reaction product a mixture of organic sulphinic acids.

2. A process which comprises reacting in an aqueous medium a saturated aliphatic hydrocarbon sulphonyl chloride mixture comprising essentially hydrocarbon mono- and poly-sulphonyl chlorides and chlorohydrocarbon mono- and poly-sulphonyl chlorides containing at least 9 carbon atoms with an agent taken from the group consisting of sodium and potassium sulphite, bisulphite, hydrosulphite and sulphide and recovering from the reaction product a sulphinic acid product.

3. A process which comprises reacting in an aqueous medium a mixture of hydrocarbon sulphonyl chlorides prepared by reacting a non-gaseous saturated aliphatic hydrocarbon in a liquid state with gaseous sulphur dioxide and chlorine in the presence of actinic light with an alkali metal reducing agent taken from the group consisting of sodium and potassium sulphite, bisulphite, hydrosulphite, and sulphide.

4. A process which comprises reacting a non-gaseous saturated hydrocarbon with a gaseous mixture of sulphur dioxide and chlorine, and reacting the resulting hydrocarbon sulphonyl chloride product in an aqueous medium with sodium sulphite.

5. A process which comprises reacting a non-gaseous saturated aliphatic hydrocarbon with a gaseous mixture of sulphur dioxide and chlorine, and reacting the resulting hydrocarbon sulphonyl chloride product in an aqueous medium with sodium sulphite and recovering a sulphinic acid.

6. The process of preparing organic sulphinic acids, which comprises reacting in an aqueous medium a mixture of cetane sulphonyl chlorides including chlorcetanesulphonyl chlorides and cetane sulphonyl chlorides prepared by reacting cetane with gaseous sulphur dioxide and chlorine in the presence of actinic light, with an alkali metal reducing agent taken from the group consisting of sodium and potassium sulphite, bisulphite, hydrosulphite and sulphide.

7. The process of preparing organic sulphinic acids which comprises reacting in an aqueous medium a mixture of petroleum white oil sulphonyl chlorides including chlorohydrocarbon sulphonyl chlorides and hydrocarbon sulphonyl chlorides prepared by reacting a petroleum white oil with gaseous sulphur dioxide and chlorine in the presence of actinic light, with an alkali metal reducing agent taken from the group consisting of sodium and potassium sulphite, bisulphide, hydrosulphite and sulphide.

ARTHUR L. FOX.